United States Patent [19]
Michael

[11] Patent Number: 5,140,679
[45] Date of Patent: Aug. 18, 1992

[54] UNIVERSAL ASYNCHRONOUS RECEIVER/TRANSMITTER

[75] Inventor: Martin S. Michael, San Jose, Calif.

[73] Assignee: National Semiconductor Corporation, Santa Clara, Calif.

[21] Appl. No.: 244,920

[22] Filed: Sep. 14, 1988

[51] Int. Cl.[5] .......................................... G06F 13/38
[52] U.S. Cl. ........................... 395/325; 364/DIG. 2; 364/942.7; 364/927.99; 364/932.8; 364/950.1; 364/939.5; 364/926.5
[58] Field of Search ..................... 371/5.3, 5.1, 57.2; 375/55, 122; 395/250, 325; 364/200 MS File, 900 MS File

[56] References Cited

U.S. PATENT DOCUMENTS

| | | | |
|---|---|---|---|
| 3,673,576 | 6/1972 | Donaldson, Jr. | 364/200 |
| 4,534,011 | 8/1985 | Andrews et al. | 364/900 |
| 4,545,055 | 10/1985 | Patel | 375/55 X |
| 4,647,926 | 3/1987 | Devensky et al. | 364/429 X |
| 4,751,572 | 6/1988 | Baumbaugh et al. | 375/122 |
| 4,800,562 | 1/1989 | Hicks | 371/5.1 |
| 4,829,471 | 5/1989 | Banerjee et al. | 364/900 |

*Primary Examiner*—Thomas M. Heckler
*Attorney, Agent, or Firm*—Limbach & Limbach

[57] ABSTRACT

Data characters to be transferred from a peripheral device to a central processing unit are serially shifted into the receiver shift register of a universal asynchronous receiver/transmitter (UART). A multiple byte first-in-first-out memory stores a plurality of data characters received by the shift register. The UART checks the status of each data character stored in the FIFO to determine whether it will trigger an exception. A bytes till exception register indicates the number of data characters remaining in the FIFO until an exception is encountered. Then, upon request by the CPU, the UART provides the count of consecutive valid data characters from the top of the FIFO to the first exception, eliminating the need to check status on every transferred byte. Each of the multiple channels of the UART includes an Initialization Register. Setting the appropriate bit Initializatioin Register of any UART channel allows concurrent writes to the same selected register in each channel's register set. This function reduces initialization time for all of the common parameters that are loaded into each channel's registers. The UART implements a methodology which allows for the processing of any control characters or errors received by the UART during DMA while internal and/or external FIFOs are being used.

15 Claims, 12 Drawing Sheets

UART BLOCK DIAGRAM (1 SERIAL CHANNEL SHOWN)

ADVANCED FEATURES REGISTER SET
32 - BITS

| A4,A3,A2 | A1,A0 11 | 10 | 01 | 00 |
|---|---|---|---|---|
| 000 | DATA | DATA | DATA | DATA |
| 001 | BSR | BSR | BSR | BSR |
| 010 |  |  | IIR | BTE |
| 011 |  |  | IER | FSR |
| 100 | CFR | COR | TOR | ROR |
| 101 | SIO | CIO | IOR | DIR |
| 110 | TCR | TCR | TCR | TCR |
| 111 | RCR | RCR | RCR | RCR |

ALTERNATE REGISTER BIT = 0 ↙ A

=1

| | 11 | 10 | 01 | 00 |
|---|---|---|---|---|
| 000 |  |  | HDR | LDR |
| 001 |  |  | AFR | DDR |
| 010 | CMP3 | CMP2 | CMP1 | CMP0 |
| 011 | CMP7 | CMP6 | CMP5 | CMP4 |
| 100 |  |  |  |  |
| 101 |  |  |  |  |
| 110 |  |  |  |  |
| 111 |  |  |  |  |

↙ B

OPTIONAL COMPATIBILITY REGISTER SET

| A2,A1,A0 | 8-BITS |
|---|---|
| 000 | Tx/Rx |
| 001 | IER |
| 010 | IIR/FCR |
| 011 | LCR |
| 100 | MCR |
| 101 | LSR |
| 110 | MSR |
| 111 | SCR |

| | |
|---|---|
| | LOW DIV. |
| | HI DIV. |

FIG. 1

REGISTER SET OVERVIEW (8, 16, 32 BITS)

UART BLOCK DIAGRAM (1 SERIAL CHANNEL SHOWN)

|  | BYTE 3 | BYTE 2 | BYTE 1 | BYTE 0 |
|---|---|---|---|---|
| DATA | 00000000 | 00000000 | 00000000 | 00000000 |
|  | LATEST |  |  | EARLIEST |

|  | STATUS BYTE 3 | STATUS BYTE 2 | STATUS BYTE 1 | STATUS BYTE 0 |
|---|---|---|---|---|
| BYTE STATUS | 00000000 | 00000000 | 00000000 | 00000000 |

7 OE
6 FE
5 PE
4 BI
3 MCH
2-0 MCH ID

|  | ← RESERVED → | | INTERRUPT ID | BYTES TILL EXCP. |
|---|---|---|---|---|
| CHANNEL STATUS | 00000000 | 00000000 | 00000000 | 00000000 |

7 RFT OR Rx TIMEOUT
6 MCH
5 LSI
4 ISI
3 TFC
2 TFE OR TCR
1 RCR
0 TEMT

|  | ← RESERVED → | | INTR. ENB. | FIFO STATUS |
|---|---|---|---|---|
| CHANNEL EXCEPTION | 00000000 | 00000000 | 00000000 | 00000000 |

7 Rx FT OR RCR        7,6 Tx FIFO SPACE
6 MCH                 5 MATCH IN Rx FIFO
5 LSI                 4 ERROR IN Rx FIFO
4 ISI                 3-0 VALID DATA
3 TFC                     LOCATIONS DURING
2 TFE OR TCR              THE NEXT READ
1 Rx TIMEOUT
0 RESERVED

ADVANCED FEATURES REGISTER SET
(BITS INDICATE THEIR STATE AFTER RESET)

FIG. 4

|  | CHANNEL FORMAT | CHANNEL OPERATION | Tx OPERATION | Rx OPERATION |
|---|---|---|---|---|
| CONTROL | 00011000 | 00000000 | 00000001 | 00111100 |

| CHANNEL FORMAT | CHANNEL OPERATION | Tx OPERATION | Rx OPERATION |
|---|---|---|---|
| 7 RESERVED | 7 ALT. REG. SEL. | 7 CMP. CLEAR | 7 XOFF INSERTION |
| 6 BLOCK MODE | 6,5 Rx COUPLING | 6 CMP. ENB. | 6,5 RCLK SOURCE |
| 5 STOP BITS | 4,3 BUS WIDTH | 5 CMP2 < ENB. | 4,3 CHARS.TILL TIMEOUT |
| 4,3 WRD. LENGTH | 2 DMA MODE | 4 CMP. Tx FLOW CONTROL | 2,1 Rx FIFO TRIGGER |
| 2 PARITY ENB. | 1 Tx DMA ENB. | 3 /CTS Tx FLOW CONTROL | 0 Rx FIFO CLEAR |
| 1 EVEN PARITY SEL. | 0 Rx DMA ENB. | 2 BREAK ENABLE |  |
| 0 STICK PARITY SEL. |  | 1 Tx FIFO CLEAR |  |
|  |  | 0 Tx ENABLE |  |

|  | SET | CLEAR | I/O | DELTA INPUT |
|---|---|---|---|---|
| CHANNEL I/O | 00000000 | 00000000 | 11111111 | 00000000 |
|  | WRITE ONLY | WRITE ONLY | READ/WRITE | READ ONLY |

|  | I/O | DELTA INPUT |
|---|---|---|
|  | 7-0 GENR'L I/O DEFAULT FUNCTIONS: | 7-0 INPUT STATUS DEFAULT FUNCTIONS: |
|  | 7,6 GENR'L I/O | 7 DELTA/DCD |
|  | 5 /DTR | 6 DELTA/RI |
|  | 4 /RTS | 5 DELTA/DSR |
|  | 3 /DCD | 4 DELTA/CTS |
|  | 2 /RI | 3 /DCD STATUS |
|  | 1 /DSR | 2 /RI STATUS |
|  | 0 /CTS | 1 /DSR STATUS |
|  |  | 0 /CTS STATUS |

|  | RESERVED ← | ← Tx CNT → | → |
|---|---|---|---|
| Tx CNT | 00000000 | 00000000 | 00000000 | 00000000 |

|  | RESERVED ← | ← Rx CNT → | → |
|---|---|---|---|
| Rx CNT | 00000000 | 00000000 | 00000000 | 00000000 |

**ADVANCED FEATURES REGISTER SET
(REMAINING REGISTERS; BITS
INDICATE THEIR STATE AFTER RESET)**

FIG. 5

```
                    ←—— RESERVED ——→    HI DIV.    LOW DIV.
DIVISOR  │ 00000000 │ 00000000 │ 00000000 │ 01111000 │

←—— RESERVED ——→      AFR        DDR
INIT     │ 00000000 │ 00000000 │ 00000000 │ 00001100 │
                                     7 CHANNEL RESET   7-0 DATE
                                     6-2 RESERVED     DIRECTION OF
                                     1 RI/BAUDOUT     THE GENR'L I/O
                                     0 CONCURRENT     PINS
                                       WRITE

BYTE 3                    BYTE 1      BYTE 0
CMP 0-3  │ 00000000 │ 00000000 │ 00010011 │ 00010001 │
                              < OR =    Tx STOP   Tx START

BYTE 7                                BYTE 4
CMP 4-7  │ 00000000 │ 00000000 │ 00000000 │ 00000000 │
```

ALTERNATE REGISTER SET DETAIL REGISTER
(BITS INDICATE THEIR STATE AFTER RESET)

FIG. 6

Tx DMA PROCEDURE

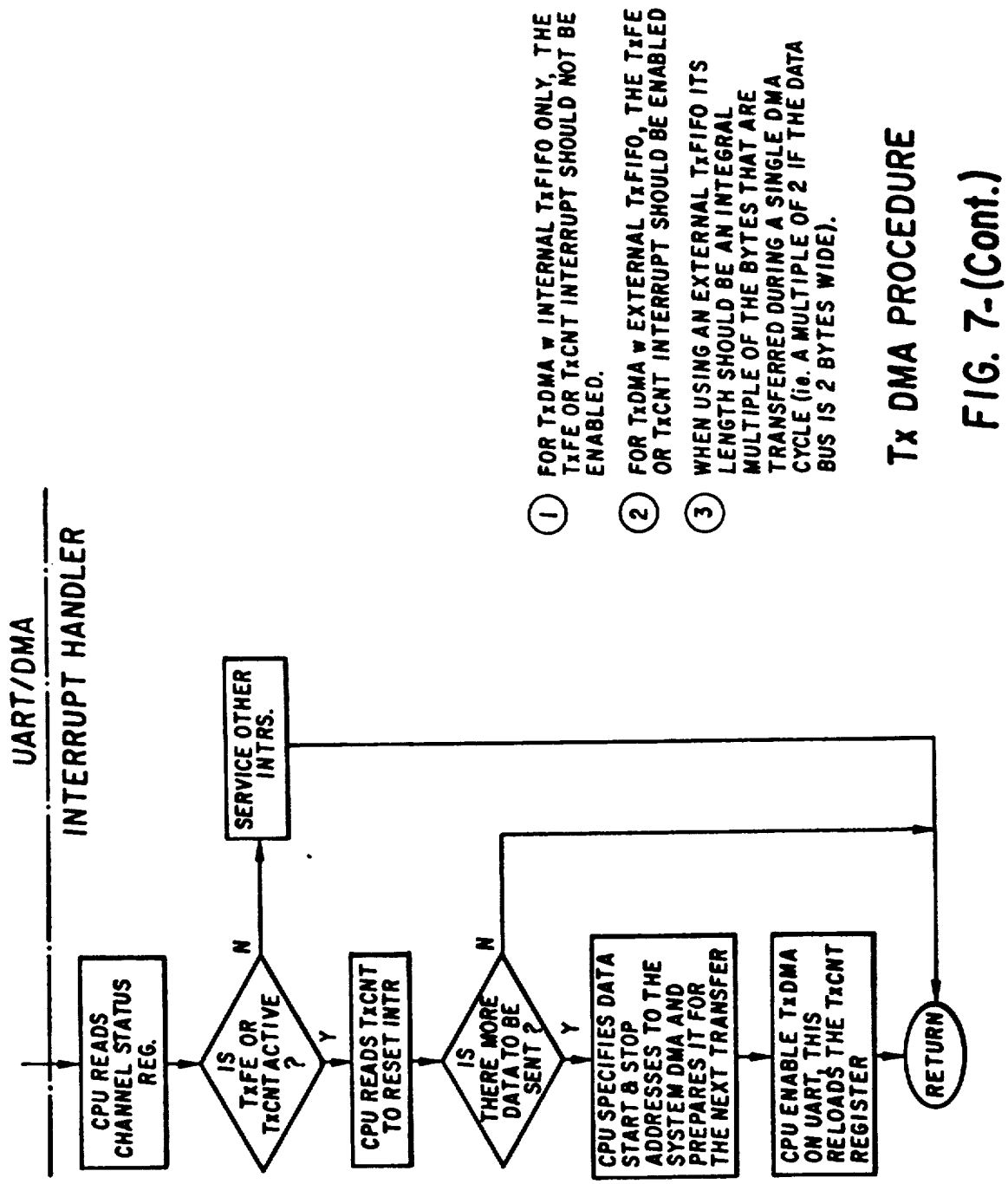

Rx DMA PROCEDURE

Rx DMA PROCEDURE

Rx DMA PROCEDURE

UNIVERSAL ASYNCHRONOUS RECEIVER/TRANSMITTER

BACKGROUND OF THE INVENTION

1. Field of the Invention

The present invention relates to data communications between a data processing system and its associated peripheral devices and, in particular, to an improved universal asynchronous receiver/transmitter (UART) device. According to a first aspect of the invention, multiple data bytes can be transferred from the UART in a single access without checking the error status of each individual byte transferred. According to a second aspect of the invention, the multiple-channel UART allows concurrent writes to the same register of each channel's identical register set. According to a third aspect of the invention, the UART processes any control characters or errors received by the UART during a direct memory access (DMA) transfer while either internal or external first-in-first-out (FIFO) memories are being used.

2. Discussion of the Prior Art

Data communications is a broad term used to define the transmission of data from one point to another.

To ensure coherent data communications between two or more points, e.g. between a data processing system and one of its peripheral devices, an interface standard is established to define the characteristics of the communication link.

The most popular interface standard for data transmission is asynchronous communication. This standard specifies that each data character to be transmitted be proceeded by a "start" bit and be followed by one or more "stop" bits. Between characters, a mark condition is continuously maintained. Because each transmitted character is bracketed by these "start" and "stop" bits, the receiver is resynchronized with each transmission, allowing unequal intervals between characters.

One commonly used asynchronous data communications device is the Universal Asynchronous Receiver/Transmitter, or UART. A conventional UART relies on two separate serial shift registers, each with its own serial port and clock, to receive data from and transmit data to a modem or peripheral device in response to control signals from the associated data processing system. This architecture allows data to be simultaneously sent and received through the UART at different data rates.

To transmit data from its associated data processing system to a selected modem or peripheral device, a UART can request the parallel transfer of data (typically an 8-bit character, or byte, which is placed on the system's data bus) into the UART's transmitter holding register. The transmitter holding register then transfers the data to a transmitter shift register which serially transmits each bit of data to the peripheral device. Initially, when the transmitter holding register is empty, the UART signals the CPU that it is ready to receive data. Data is transferred when a data strobe input from the system to the UART is appropriately pulsed.

Since the transmitter holding register is "empty" as soon as the parallel transfer of data to the transmitter shift register occurs, even if the actual serial shifting of data by the shift register is not complete, the UART can indicate to the data processing system that a new data character may be loaded into the holding register. When the new data is loaded into the holding register, if the serial transmitter shift register is not yet free, then the data is held in the holding register until the serial shift of the initial data is completed. The transfer of the new data into the shift register is then allowed to take place.

Thus, a conventional UART can retain a maximum of two data characters for transmission from its associated data processing system. If the full transmission requires the transfer of more than two characters, then the data processing system, which can transfer data much faster than the UART's transmitter shift register, must either wait for the shift register to complete its serial transfer or undertake different tasks and then respond to multiple interrupts from the UART to complete the transmission. Both alternatives are an extremely inefficient use of data processing time.

Receipt of data by the data processing system from a modem or other peripheral device via the UART is subject to the same time inefficiencies as is data transmission. That is, the processor is inhibited by the operating rate and data capacity of the UART's receiver section. As in data transmission, to receive data, the UART utilizes a shift register and a holding register. A data character is shifted serially from the modem or peripheral device into a serial-to-parallel receiver shift register. When the entire data character has been assembled in the shift register, it is transferred to a receiver holding register, freeing the receiver shift register to receive the next character from the transmission line. The UART indicates to the processor system that it has received data ready to be transferred and places the data on the system bus for parallel transfer when the appropriate strobe is received from the system.

UARTs may be used either in an interrupt mode or in a polling configuration. In the interrupt configuration, the UART sends an interrupt to the data processing system which services it by either placing data on or retrieving data from the system bus. Because a conventional UART can only retain a single data character in each of its receiver and transmitter holding registers, multiple interrupts are required if many data bytes are to be transmitted or received.

To reduce the interrupt overhead of the processor, a more recent UART design has replaced the single-byte receiver and transmitter holding registers with multiple-byte first-in-first-out (FIFO) memories. The National Semiconductor Corporation NS16550A UART utilizes two user-selectable 16-byte FIFO memories as transmitter and receiver buffers. These transmitter and receiver FIFOs permit accumulation of data characters within the UART, eliminating the requirement for multiple interrupts to the processor in its transmission and receipt of data A UART of this type is described in pending U.S. patent application Ser. No. 924,797 filed Oct. 30, 1986 by Michael et al for ASYNCHRONOUS COMMUNICATION ELEMENT, now U.S. Pat. No. 4,823,312; the just-identified Michael et al application is hereby incorporated by reference to provide additional background information for the present invention.

Although the NS16550A UART is a highly advanced device, its status indications are based primarily on single byte error indications.

In the vast majority of cases, data that has been received by the UART is error free. Conventional status indications, however, have not allowed the data processing system to detect the number of consecutive error-free data bytes in the receiver FIFO. This prevents the removal of consecutive data bytes by the data processing system until the status for each byte is first read. Since the status of error-free data is inconsequential, a considerable portion of the access time of the data processing system is being wasted, i.e. two clock access for each data byte to be read in the case of error-free data.

UARTS are also available that provide multiple channels for asynchronous communications between a data processing system and a number of associated peripheral devices. Each UART channel includes its own register set, identical to the register set of each of the other channels. This register set stores information that characterizes the channel relative to its operation. Typically, the register set of each channel is loaded with the appropriate digital information on initialization of the UART; this information may then be modified dynamically to meet changing operating requirements. A problem inherent in conventional multi-channel UARTS is that, although it may be desired to load identical information into corresponding registers of each channel, this information must be sequentially loaded into the registers of individual channels. Thus, the loading of the registers with identical information, both upon initialization and upon dynamic modification wastes valuable processing time.

The transfer of data in a data processing system can be generally referred to as one of three basic types: I/O mapped, memory-mapped or direct memory access (DMA). I/O-mapped and memory-mapped transfers and require processor intervention, thus tying up the processor during the time that data transfers are being implemented. In DMA transfers between a peripheral device and system memory, a path is provided for direct data transfer without processor intervention. Thus, utilizing this path, the peripheral device can transfer data directly to or from the memory at high speed while freeing the processor to perform other tasks during the transfer.

Unfortunately, the DMA capabilities of conventional UARTs do not allow for the handling of control characters, errors or varying amounts of data received by the UART during DMA while using either internal or external FIFOs. Conventional UARTs do not distinguish between control characters, errors or varying amounts of valid data before requesting a DMA transfer. Thus, the data processing system must either resolve all exceptional data cases or prevent DMA transfer of received data. However, as stated above, since most of the received data are valid and without exceptions, the UART need only request processing time for data transfers when it detects an exceptional data byte.

SUMMARY OF THE INVENTION

A Universal Asynchronous Receiver/Transmitter (UART) in accordance with the present invention provides an associated data processing system with a count of the number of consecutive data bytes that can be removed from the UART's receiver first-in-first-out (FIFO) memory before an exception must be handled. The count is provided to the data processing system on each read cycle. The processor then proceeds to read all consecutive valid data bytes in a single access. The number of clock cycles required for the read access equals one cycle for reading the valid bytes count plus one cycle for each byte to be read. This represents a considerable savings in processor time, since conventional UARTs require that the processor access two registers, status and data, for every data byte removed from the receiver FIFO.

Thus, in accordance with this first aspect of the invention, data characters to be transferred from a peripheral device to a central processing unit are serially shifted into the receiver shift register of a universal asynchronous receiver/transmitter. A multiple byte first-in-first-out memory stores a plurality of data characters received by the shift register. The UART checks the status of each data character stored in the FIFO to determine whether it will trigger an exception. A "bytes till exception" register indicates the number of consecutive data characters remaining at the top of the FIFO until an exception is encountered. Then, upon request by the processor, the UART provides the count of consecutive valid data characters from the top of the FIFO to the first exception, eliminating the need to check status on every transferred byte.

In accordance with a second aspect of the present invention, each of the identical register sets associated with each of the multiple channels of the UART includes an Initialization Register. Setting the appropriate bit in the Initialization Register of any UART channel allows the data processing system to concurrently write to the same selected register in each channel's register set. This function reduces initialization time for all of the common parameters that are loaded into each channel's registers.

In accordance with a third aspect of the present invention, the UART implements a methodology which allows for the processing of any control characters, errors or varying amounts of other data received by the UART during DMA while internal and/or external FIFOs are being used.

Other features and advantages of the present invention will be understood and appreciated by reference to the detailed description of the invention provided below which should be considered in conjunction with the accompanying drawings.

DESCRIPTION OF THE DRAWINGS

FIG. 1 is a schematic representation of an Advanced Features Register set of a UART in accordance with the present invention.

FIG. 4 is a schematic representation of the format of Data, Byte Status, Channel Status and Channel Exception Registers of the Advanced Features Register Set of a UART in accordance with the present invention.

FIG. 5 is a schematic representation of the format of Control, Channel I/O, Tx CNT and Rx CNT Registers of the Advanced Features Register Set of a UART in accordance with the present invention.

FIG. 6 is a schematic representation of the format of Divisor, Initialization, Comparison Registers 0-3 and Comparison Registers 4-7 of the Alternate Register Set of a UART in accordance with the present invention.

DETAILED DESCRIPTION OF THE INVENTION

Referring to FIG. 1, the advanced register set A of a Universal Asynchronous Receiver/Transmitter (UART) in accordance with the present invention consists of eight 32-bit wide registers including five registers (addresses 00000 through 10000) for standard serial channel operation, DMA operation, and automated transmit Tx flow control, one register (address 10100) for modem or general purpose I/O features and two registers (addresses 11000 and 11100) for external FIFO control.

In addition to the advanced register set A, an alternate register set B that includes eight 32-bit registers is accessible by setting an Alternate Register Bit. The alternate register set B is used primarily during UART initialization. Received data comparison registers, a baud rate divisor, and an I/O data direction register (accessed at addresses as indicated in FIG. 1) are all accessible when the Alternate Register Bit is set.

Figure 2:
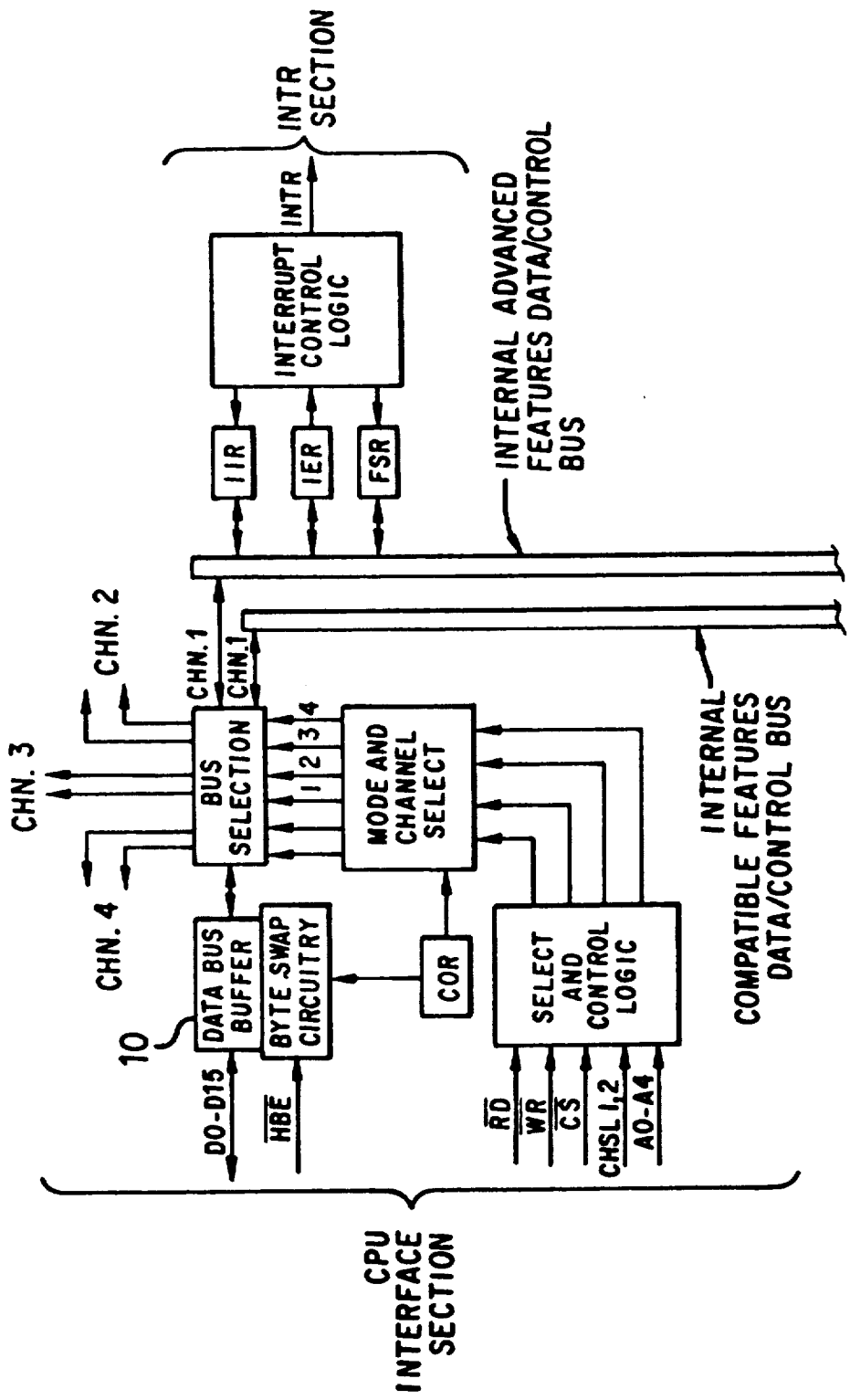
FIG. 2 is a block diagram illustrating the architecture of a UART in accordance with the present invention.
Figure 2:
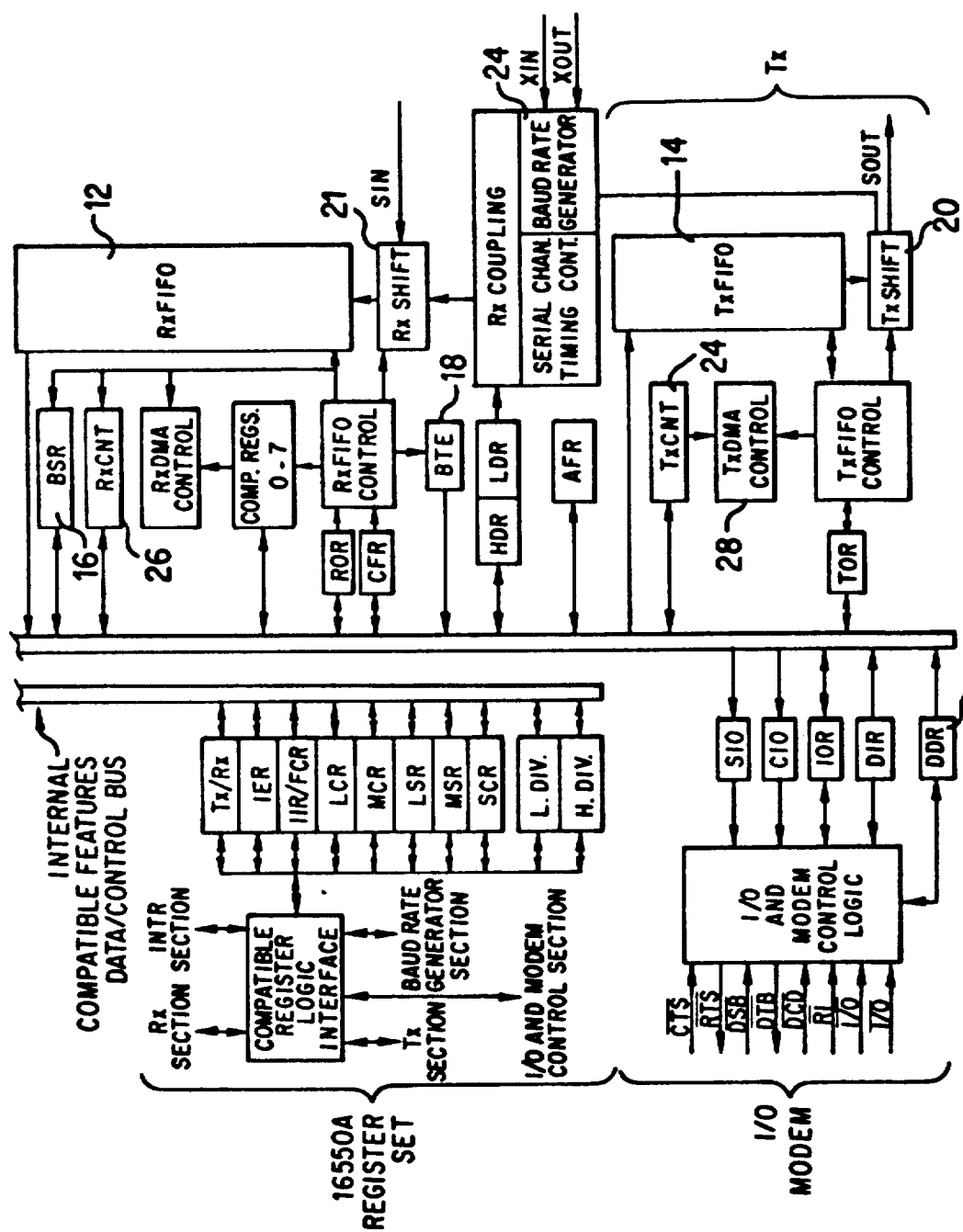

Referring to FIG. 2, five address pins A0–A4 are used to select the internal registers. Identical register sets are present on each of four serial channels available in the UART embodiment described below; channel select pins are provided for access to the register sets of each serial channel.

All four UART channels reset to a Compatibility Mode. Two bits in a Compatibility Mode register set, shown in FIG. 1, allow selection of 8, 16, 32-bit bus width or Compatibility Mode operation. These two bits are IER6 and IER7 in the Interrupt Enable Register (IER), which is discussed in greater detail below. If IER6, 7 are set to 00, 01, 10 to 11, then UART modes are Compatibility, 8, 16, or 32-bit, respectively.

Referring again to FIG. 1, a DATA Register (address 00000) is organized as 4, 2 or 1 byte wide fields, depending on the programmed bus width. In FIG. 2, the DATA Register represents the storage location at the top of a FIFO, in the case of both the receiver and transmitter portions of the UART, and is used to read data from a Receiver Rx FIFO 12 or write data to a Transmitter Tx FIFO 14. (Any reference in the following description to "Rx FIFO" or "Tx FIFO" is a reference to internal UART FIFOs 12 and 14, respectively. Any reference to an external Tx FIFO or an external Rx FIFO will be preceded by the word "external.")

The Rx and Tx FIFOs 12 and 14, respectively, are a constant length regardless of the bus width. This means that one-half the number of accesses are required to transfer data to/from these FIFOs in the 16-bit mode as compared to 8-bit mode and one-quarter the number of accesses are required to transfer data to/from these FIFOs in 32-bit mode as compared to 8-bit mode.

Figure 3:
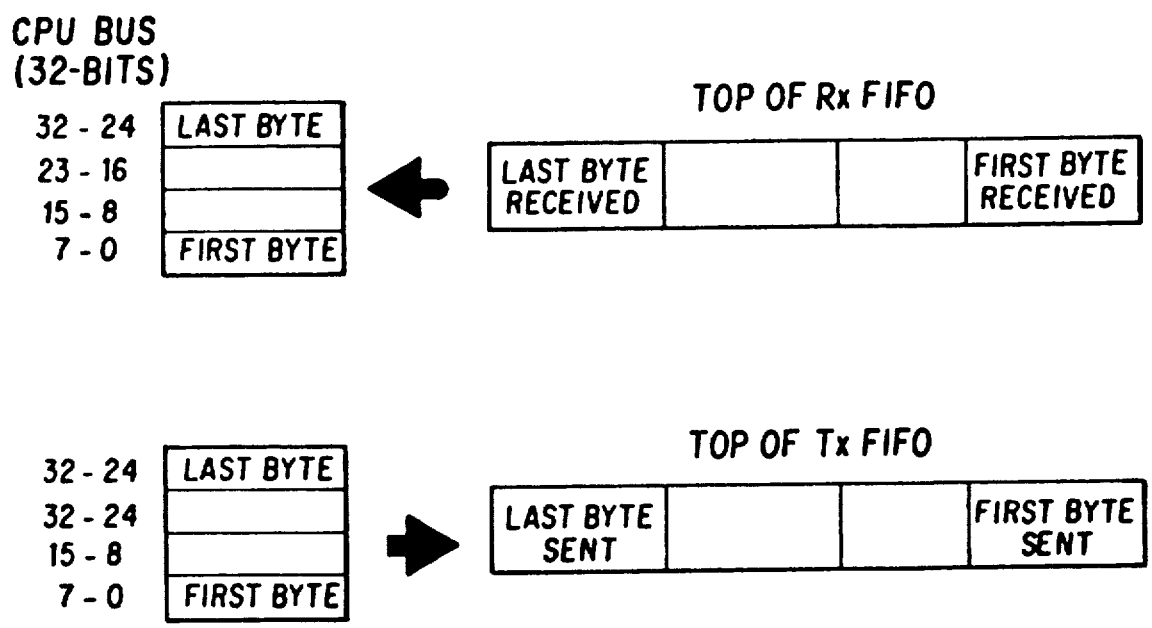
FIG. 3 is a schematic representation of Rx FIFO and Tx FIFO data transfers in a UART in accordance with the present invention.

As illustrated in FIG. 3, when transferring multiple bytes from Rx FIFO 12 through a Data Bus Buffer 10 during a single access (16-bit or 32-bit Mode), the least significant byte on the CPU bus is the byte that was received earlier than the other bytes; when transferring multiple bytes to Tx FIFO 14 through Data Bus Buffer 10 during a single access (16-bit or 32-bit Mode), the least significant byte on the CPU bus is the first byte sent out on the serial line.

Byte Status Register (BSR) 16 provides the associated line status and byte match information for each byte that the CPU reads from Rx FIFO 12. As shown in FIG. 1, BSR 16 (address 00100) contains 4, 2 or 1 byte-wide fields, depending on the programmed bus width. The type of information provided by BSR 16 for each received data byte is overrun, parity and framing errors; break indication, byte match, and byte match ID. Individual byte status remains in BSR 16 until the associated data has been read from Rx FIFO 12. BSR 16 is updated with status for the next group of data bytes as soon as these bytes can be read from the Rx FIFO 12. In the block mode, described in greater detail below, BSR 16 accumulates the status of each byte until it is read. If there are fewer data bytes than the full bus width to be given during the data read, the status bytes in BSR 16 will correspond to the position of the data bytes that can be read from Rx FIFO 12.

A Channel Status Register (CSR) provides the status indication for all interrupts conditions. As shown in FIG. 1, CSR (address 01000) contains two byte-wide fields named Interrupt Identification (IIR) and Bytes Till Exception (BTE) and two byte-wide reserved fields.

The bits of the IIR field are set when their associated interrupt condition is active. The appropriate bit in the IER must be set before any indication in the IIR field can activate the external interrupt signal. The IIR bit, however, is set when there is an active interrupt condition regardless of the interrupt enable bit setting.

The following interrupt conditions each set one IIR bit:

1. Reaching a programmed receiver trigger level or an active receiver timeout condition sets bit IIR7.
2. A match in any of the Comparison Registers (described below) sets bit IIR6.
3. A line status error condition (parity, framing, overrun, break) sets bit IIR5.
4. A change in any input status indicator from the general purpose I/O lines programmed as inputs in the Data Direction Register (described below) sets bit IIR4.
5. A match in either of the Comparison Tx Flow Control Registers sets bit IIR3.
6. A Tx FIFO Empty (TFE) condition or completing a pre-programmed number of transmitter transfers via DMA sets bit IIR2. The TFE condition is cleared after the transmitter enable bit is reset or a byte is loaded into the Tx FIFO 14.
7. Completing a preprogrammed number of receiver transfers via DMA sets bit IIR1.

IRR bit 0 (TEMT) is set when the transmitter is completely empty. The setting of this bit cannot cause an interrupt to occur, but it is included in this register for the convenience of checking the transmitter during half duplex operation.

Referring back to FIG. 2, in accordance with one aspect of the present invention, Bytes Till Exception Register (BTE) 18 indicates how many bytes remain in Rx FIFO 12 until an exception is encountered. An exception is defined in this context as anything other than valid data, e.g. an empty Rx FIFO 12, a line status error or a Comparison Register match. The BTE count is the status indicator that the system will use most often, since data is usually received by the UART without error. The count in BTE 18 is updated after every read of the Rx FIFO 12 by the CPU.

BTE 18 eliminates the need to check status on every byte, since the CPU can now allow the UART to perform this function. The UART then provides the count of consecutive valid data bytes from the top of the Rx FIFO 12 to the first exception. The CPU uses this variable count to determine the number of bytes to extract from the Rx FIFO 12 in a read access.

In the 16-bit mode, the Channel Status is accessed through one 16-bit wide register; in the 8-bit mode, the Channel Status is accessed through the two byte-wide registers IIR and BTE.

Referring to FIG. 1, Channel Exception Register (CER) (address 01100) contains two byte-wide fields named Interrupt Enable (IER) and FIFO Status (FSR) and two byte wide reserved fields.

The IER field holds the interrupt enable data. The eight possible interrupts are:
1. Receiver FIFO Trigger Level (RFT) or Receiver Count (RCR);
2. Match (MCH);
3. Line Status (LSI);
4. Input Status (ISI);
5. Transmitter FIFO Flow Control (TFC);
6. Transmitter FIFO Empty (TFE) or Transmitter Count (TCR); and
7. Receiver Timeout (RTO)

The RFT and RCR interrupts are mutually exclusive operations in the UART, as are the TFE and TCR interrupts. All interrupt priorities are user determined.

The FSR field indicates the number of empty spaces in Tx FIFO 14, whether or not there is a match or an error detected anywhere in Rx FIFO 12, and which bytes in the DATA Register are valid receiver serial data. Bits FSR7, 6 indicate the number of empty spaces in Tx FIFO 14 according to the following code:

| FSR | 7 | 6 | Tx FIFO State |
|---|---|---|---|
| | 0 | 0 | empty |
| | 0 | 1 | ½ full |
| | 1 | 0 | 1 space empty |
| | 1 | 1 | full |

Bit FSR5 indicates that at least one byte is loaded in Rx FIFO 12 that matches a byte in Comparison Registers 2–7. This bit is used as an advanced signal that there is a control character to be processed.

Bit FSR4 indicates that there is at least one Line Status indication associated with a data byte in Rx FIFO 12. This bit is used as an advanced signal that an error or break has occurred.

Bits FSR3–0 indicate the byte positions at the top of Rx FIFO 12 that contain valid data. This is needed by the CPU only when there is less than an integral number of data bytes presented during a 16- or 32-bit wide read. When there are less bytes of valid receiver data in DATA Register than the data bus is wide, then bits FSR3–0 in the FSR field are set to indicate the valid data byte positions. Only the consecutive data bytes that are valid at the time that the FSR field is read will be issued to the CPU during the next read of DATA Register. Thus, by comparing the bits that are set in the FSR to the bytes received from DATA Register, the user can determine which bytes are valid. This technique means that the UART will not move additional data into the top of the FIFO until the CPU reads the DATA register. Therefore, the CPU should read the DATA Register as soon as possible after reading the FSR to "free" any unused space in the top of the FIFO. Bytes will still be taken into the open space not included in the top of the FIFO during this time.

Using a 32-bit wide CPU data bus, the following example is given. The CPU reads the FSR field when there are only three consecutive valid data bytes in Rx FIFO 12 and no other data. Thus, the FSR has the three lowest order bits set. When the CPU then reads the DATA Register, the UART will only issue three valid data bytes in the lowest byte positions and a 00 character in the highest byte position. This is the case even if a valid data byte enters Rx FIFO 12 between the time the CPU reads the FSR field and the time it reads the DATA Register. At all other times, the data presented to the CPU bus will be as wide as the bus.

Using a 16-bit wide CPU data bus, the following example is given. The CPU reads the FSR field when there is only one valid data byte in Rx FIFO 12 and no other data. Thus, the FSR field has the lowest order bit set. When the CPU then reads the DATA Register, the UART will only issue one valid data byte in the lowest byte positions and a 00 character in the highest byte position. This is the case even if a valid data byte enters Rx FIFO 12 between the time the CPU read the FSR field and the time it read the DATA Register. At all other times, the data presented to the CPU bus will be as wide as the bus.

The Control Register (address 10000) is the heart of UART operations. It contains four byte-wide fields that are identified in FIGS. 1 and 2 as Channel Format (CFR), Channel Operations (COR), Transmitter Operation (TOR) and Receiver Operation (ROR).

The CFR field controls the UART block mode enable and serial data format. The block mode determines whether or not receiver errors will be accumulated in BSR 16. If the block mode is enabled, BSR 16 accumulates all errors, breaks and matched information associated with data passing through the top of Rx FIFO 12. The results of this accumulation is indicated by the LSI and Match bits in the IIR field. After the CPU reads BSR 16, all status bits are cleared, including the associated IIR bits. Setting bit CFR6 enables the block mode.

The serial data format specification includes data length (5–8 bits), stop bits (1, 1-½, 2), and parity. When bit CFR5 is 0, one stop bit is sent with all data combinations. When bit CFR5 is 1, two stop bits are sent with all combinations of data, except 5-bit data which is sent with 1.5 stop bits. The setting of bit CFR5 does not affect the receiver; it only checks for 1 stop bit. Bits CFR4,3 select the number of data bits transmitted or received in each character. If bits CFR4,3 are 00, 01, 10, or 11, then 5, 6, 7, or 8 bits are serially transmitted and received, respectively. Setting bit CFR2 enables parity transmission and reception. When parity is enabled, even parity is selected by setting bit CFR1. Clearing bit CFR1 when parity is enabled results in odd parity. Setting bit CFR0 enables mark or space parity if the parity enable bit CFR2 is set. If bits CFR2 and CFR0 are set, then CFR1 determines whether mark (CFR1=0) or space (CFR1=1) parity is transmitted and received.

Bit CFR7 is reserved. When written to, this bit should be set to 0 and when read it will always indicate 0.

The COR field controls Alternate Register selection, receiver coupling, the data bus access width, DMA mode selection, transmitter DMA enable and receiver DMA enable. The Alternate Registers (Baud Rate Divisor, Alternate Function Register, Data Direction Register and the Comparison Registers are accessible when bit COR7 is set. As stated above, these Alternate Registers are used primarily during initialization to establish the base hardware configuration of the serial channel.

Two bits are used to detemine the receiver coupling (00=normal, 01=local loopback, 10=remote loopback and 11=echo mode). Selecting normal mode (default) transfers all of the data the receiver receives to Rx FIFO 12. Selecting the local loopback mode causes the data transferred to the transmitter to be internally sent to the receiver. Selecting the remote loopback mode causes the transmitter to send every byte the receiver receives, without these bytes entering Rx FIFO 12. Selecting the Echo Mode causes the transmitter to send a duplicate of every valid data byte that is in the top of Rx FIFO 12. No bytes that cause exceptions, i.e. an LSI condition or a Match condition) are echoed. When the next byte to be echoed is a byte with an exception, Echo Mode is automatically disabled by setting COR 6,5 to 00 (normal mode). At that point in time, the CPU should respond to the exception and echo the appropriate (s). The CPU will re-enable to ECHO Mode after the exception is processed.

Using the Comparison Registers in conjunction with the Echo Mode and Rx DMA only requires CPU intervention during the receipt of control characters or corrupted data. Because there are many control characters in the ASCII set below 1F hex that do not get echoed, Comparison Register 2 has an additional capability. It can match with any byte entering the Rx FIFO that is less than or equal to its programmed value when the "less-than-or-equal-to" option is specified by setting TOR5. When TOR5=0, Comparison Register 2 will operate on a "equal-to" basis only. Thus, in the case of automatically echoing ASCII characters, the CPU can:
1. Set TOR5;
2. Load 1F hex into CMP2;
3. Load 7F hex into CMP3; and
4. Set COR 6,5 to 11, respectively.

All characters received between the value 20 and 7E hex will be automatically echoed by the UART. All other values would create exceptions, thus signalling the CPU and disabling the Echo Mode.

Bits COR4,3 detemine the data bus width. The data bus can be either 8, 16 or 32 bits wide. The 8-bit wide bus has two modes of operation: Compatibility Mode or 8-bit Mode. If bits COR4,3 are equal to 00, 01, 10 or 11, then the operating modes are Compatibility Mode, 8-bit mode, 16-bit mode and 32-bit mode, respectively.

Bits COR2,1,0 control Tx and Rx DMA. Bit COR2 determines the DMA mode; the two options are single-transfer (bit COR2=0) and multi-transfer (bit COR2=1). Setting bit COR1 enables transmitter DMA; setting bit COR0 enables receiver DMA. When either of these options are disabled, their output signals (DMA request) are inactive (high).

The TOR field controls the transmitter and Comparison Register operations. Through this byte, the CPU can:
1. Enable or disable the transmitter;
2. Clear Tx FIFO 14;
3. Program a transmitter break;
4. Enable transmitter control through/CTS;
5. Enable CMP2 to match on either a less than or equal to condition;
6. Enable transmitter flow control through the Comparison Registers;
7. Clear the Comparison Registers; and The transmitter enable bit allows the CPU to control the transmitter directly and also to override any automatic flow control changes that have impacted the transmitter enable state. Clearing Tx FIFO 14 is useful if a retransmission of data is required. The transmitter break bit (TOR2) sets the SOUT signal high for as long as it equals 1. /CTS Tx flow control enables or disables the transmitter as general purpose I/O bit 0 changes from active to inactive, respectively. Comparison Tx flow control enables or disables the transmitter as Comparison Registers 0 and 1 match the incoming data. These last two transmitter control options automatically set and clear the transmitter enable bit. As stated above, bit TOR5 enables the less-than-or-equal-to option for Comparison Register 2. If TOR5=0, then CMP2 will match only when the byte entering Rx FIFO 12 equals its programmed value. If TOR5=1, then CMP2 will match when the byte entering RxFIFO 12 is less than or equal to its programmed value. Bit TOR6 enables the general purpose Comparison Registers (COMP0-7). Of these registers, the ones that are loaded with data after a reset or a Comparison Register clear are the ones that are actually compared to the incoming data bytes. TOR6 is used to clear the Comparison Registers without resetting the UART; this bit is self-clearing. This feature can be useful when loading the Comparison Registers with a new set of data that contains fewer bytes than the previous set.

The ROR field controls receiver Rx operations. Through this byte, the user can control the insertion of a flow control character into the transmitter data stream, the receiver clock source, the number of receive character times delayed until a receiver timeout is issued, set-up the receiver trigger level and clear the Rx FIFO 12.

Writing to ROR7 causes the UART to insert the byte programmed in Comparison Register 1 (i.e. XOFF) into Tx Shift Register 20 as soon as the present character in Tx Shift Register 20 has been sent.

The receiver clock (RCLK) for each of the four UART channels can be independently derived from any one of four sources. Setting bits ROR6,5 to 00, 01, 10 and 11 selects the RCLK source to equal the baud rate generator output, $\frac{1}{2}$ the baud rate generator output, $\frac{1}{4}$ the baud rate generator output or the signal at the RCLK pin, respectively. After reset, the default value of bits ROR6,5 is 00. These options are provided primarily to allow high-speed transmission of data to a peripheral device which will only be providing low-speed keyboard or flow control data back to the CPU. Secondarily, it requires fewer pins to support a UART with multiple receivers. The transmitter is unaffected by this section and is always driven by the baud rate generator output.

A receiver timeout interrupt is used by each serial channel of the UART to indicate that data is present in its Rx FIFO 12 and that no CPU or serial channel activity has occurred during a specified period of time. This feature activates when there is data in Rx FIFO 12 that can't reach the interrupt trigger level. It ensures that the CPU will get an interrupt indicating the presence of receiver data. The amount of delay before a timeout interrupt is issued is programmable using bits 4 and 3 of the ROR field. The delay is based on the receiver clock and is equal to an integral number of receive character times. If bits ROR4,3 are equal to 00, 01, 10 or 11, then the number of receiver character times delayed before a timeout interrupt is issued is 1, 2, 3 or 4 receive character times, respectively. A reminder timeout interrupt is issued if the following conditions are met:

1. Data is in Rx FIFO 12;
2. The CPU has not accessed Rx FIFO 12 during the timeout period; and
3. No new serial number has entered Rx FIFO 12 during the timeout period.

The receiver timeout interrupt timer is reset whenever a CPU access occurs or a byte is added to Rx FIFO 12. It is started when there is a byte in Rx FIFO 12.

Bits ROR2,1 determine the number of bytes that must be in Rx FIFO 12 before a receiver interrupt is issued. Setting bits ROR2,1 to 00, 01, 10, 11 will result in a receiver interrupt being issued when there are 1, 4, 8 or 15 bytes, respectively, in Rx FIFO 12.

Clearing Rx FIFO 12 is useful when there is an error in the FIFO and it is not desired to extract each byte individually before a retransmision occurs.

In 16-bit mode, the Control Register is accessed through two 16-bit wide registers called the Channel and the Tx/Rx Operation. In the 8-bit mode, the Control Register is accessed through the four byte-wide registers CFR, COR, TOR and ROR.

Referring to FIGS. 1 and 2, the Channel I/O register (address 10100) controls all eight UART I/O pins that can be used for a modem interface or as general purpose I/O. The modem interface is configured automatically after reset and provides all of the standard input (/CTS, /DSR, /DCD, /RI) and outputs (/RTS, /DTR). The Channel I/O register contains four byte wide fields: Set I/O (SIO), Clear I/O (COR), I/O Registers (IOR), and Delta Input (DIR).

The Set I/O field is used to set individual output pins. Corresponding output pins will be set on the trailing edge of the write strobe when their bits in this field have 1s written to them. These eight bits are write only.

The clear I/O field is used to clear individual output pins. Corresponding output pins will be cleared on the trailing edge of the write strobe when their bits in this field have 1s written them. These eight bits are write only.

Simultaneously writing to bits in both the Set and Clear I/O fields that correspond to the same output pin will result in no change in the output pin. Simultaneously setting and clearing different output pins through these fields is allowed. Setting or clearing input pins only sets or clears the corresponding output latch.

The IOR field determines the state of the out-going I/O lines. Writing a 1 to any of the IOR bits sets the corresponding output pin high; writing a zero sets it low. All writes to the IOR field are on a byte wide basis. If the corresponding pin is an input, the 1 is written into the output latch, but it doesn't affect the pin. Bits of this field are both read and write. When reading bits that are designated outputs, the value of the output latch is returned. Reading bits that are designated inputs provides the status of the pins.

The DIR field provides input status information for any of the I/O pins programmed as inputs (a change in any of the input lines sets the corresponding bit in this register). The setting of any delta bits in the DIR field can cause an interrupt to be issued to the CPU if ISI interrupts are enabled in the IER field. These status bits are read only; writing to them does nothing. When the /CTS Tx Flow control bit in the DIR field is enabled, I/O bit 0 is automatically made to look like an input. The line becomes the /CTS input line which enables and disables the transmitter.

After reset, the IOR, DIR and DDR fields are automatically initialized to a condition that assumes the UART is connected to a modem or an Electronic Industries Association (EIA) interface.

In this configuration, the bits are all programmed to 1, assigned specific functions (i.e., /CTS, /RTS, etc.), and have a predetermined direction established in the DDR 22. Since this is essentially a general purpose I/O port allowing various configurations, the default pin and bit assignments are used when communicating with a modem or an EIA interface to preserve system compatibility. The default assignments for the bits are as follows:

| BIT | IOR | DIR | DDR |
|-----|-----|-----|-----|
| 0 | /CTS | /CTS | input |
| 1 | /DSR | /DSR | input |
| 2 | /RI | /RI | input |
| 3 | /DCD | /DCD | input |
| 4 | /RTS | /CTS (delta) | output |
| 5 | /DTR | /DSR (delta) | output |
| 6 | /GENR'L I/O | /RI (delta) | input |
| 7 | /GENR'L I/O | /DCD (delta) | input |

The trailing edge of the /RI (ring indicator) signal sets the status bit in the DIR field.

In the 16-bit mode, the I/O Register is accessed through two 16-bit wide registers called the Set/Clear and the IOR/DIR Registers. In the 8-bit mode, the I/O fields is accessed through the four byte-wide registers SIO, CIO, IOR and DIR.

Referring to FIGS. 1 and 2, the TCR and RCR Registers 24 and 26, respectively, contain four byte wide fields, three of which are named Tx Count (TCR) or Rx Count (RCR), respectively. These registers, along with the DMA capability of the UART, can be used to create and control external FIFOs for the data, as described in greater detail below.

The TCR Register 24 (address 11000) is a programmable counter used to track the number of bytes loaded into Tx FIFO 14 via DMA. The number of bytes that are to be transferred to Tx FIFO 14 via DMA before a TCR interrupt is issued by the UART is programmed. The TCR counter 24 decrements for each byte transferred to Tx FIFO 14. When the zero count is reached, transmitter DMAs are disabled and the TCR bit in the IIR field is set. IF the TCR bit in the IER field is enabled, then the interrupt pin goes active low. If the TCR bit in the IER field is not enabled, then only the TCR bit in the IIR field is set. The actions associated with the TCR counter 24 only take place if transmitter DMA is enabled and the counter 24 is loaded with a value other than zero. If the TCR counter 24 is not loaded after reset, or is loaded with a value of zero, then the actions associated with this counter do not take place. This DMA process can be halted at any time by disabling transmitter DMA or by loading counter 24 with zero.

The RCR register 26 (address 111) is a programmable counter used to track the number of bytes loaded into system memory (RAM) via DMA. The number of bytes that are to be transferred from Rx FIFO 12 via DMA before receiver DMA interrupt is generated by the UART is programmed. The RCR counter 26 decrements for each byte transferred from Rx FIFO 12. When the zero count is reached, the UART disables receiver DMAs. The Rx DMA bit in the IIR field is set and the UART's INTR line goes active low if it is enabled in the IER field. The actions associated with counter 26 only take place if receiver DMA is enabled and counter 26 is loaded with a value other than zero. If the counter 26 is not loaded after reset, or is loaded with a value of zero, then the actions associated with counter 26 do not take place. This DMA process can be halted at any time by disabling receiver DMA or by loading counter 26 with zero.

Referring again to FIGS. 1 and 2, the Baud Rate Divisor Register (address 00000 in the Alternate Register Set) contains two byte wide fields named High Divisor (HDR) and Low Divisor (LDR) and two byte wide reserved fields. The HDR and LDR fields hold the 16-bit wide divisor for the channel's baud rate generator 24. The HDR field contains the high byte of the divisor and the LDR field contains the low byte. This register resets to 000C hex. This is the divisor for 9600 baud if XIN is connected to an 1.8432 MHz clock input.

The Initialization Register (address 00100 in the Alternate Register Set) contains two byte-wide fields named Alternate Function (AFR) and Data Direction (DDR) and two reserved fields. The AFR field contains three active bits. In accordance with a second aspect of the present invention, setting bit AFR0 in any of the UART's four channels allows the CPU to concurrently write to the same selected register in each channel's auto-register set. This function reduces initialization time for all of the common parameters that are loaded into each channel's registers. The CPU can set or clear bit AFR0 by accessing any channel's register set. When bit AFR0 is set, the channel select pins still determine which channel will be accessed during read operations. Setting or clearing bit AFR0 has no effect on read operations.

Bit AFR1 determines the function of the /MF pin. IF AFR1=0 (the default state), then the /MF pin will provide the normal ring indicator function (the signal ring indicator is normally activated by a modem that has sensed an incoming phone call.) When AFR1=1, the /MF pin will provide the output for that channel's BAUDOUT signal.

Setting bit AFR7 resets the associated channel. This is a user reset that is channel specific, as opposed to the reset that resets all of the channels.

The DDR field establishes the data direction for the general purpose I/O. Setting any bit to 1 in the DDR field causes the corresponding I/O bit to be an output. This field is always accessed on a byte wide basis. After reset, the DDR field is automatically initialized to the default modem configuration. The six lower bits in the DDR field are used in the modem interface and function as previously described, and the two upper bits are programmed as inputs. The DDR field resets to 0C, which establishes the direction for the standard modem and EIA interface signal assignments.

The Comparison Registers (addresses 01000 and 01100 in the Alternate Register Set) are byte-wide registers that are compared to the bytes in Rx FIFO 12 for a match. Both registers consist of four byte-wide fields named Comparison 0 (CP0) through Comparison 3 (CP3) and Comparison 4 (CP4) through Comparison 7 (CP7). These registers are programmed during initialization with the data (typically, hex representation control characters) that are to be matched during receiver operation. Once they are enabled, by setting bit COR5, they will be compared to the received data when it enters Rx FIFO 12. Anytime a match with a received byte occurs, bit 6 in the IIR field will be set when the matched byte is at the top of Rx FIFO 12. An interrupt will be issued to the CPU if it is enabled in the IER field.

The Match status bit in BSR 16 associated with the matched data byte will be set, so that the matched byte can be identified. Also, the Comparison Register ID bits in the appropriate BSR 16 will be set. Only Comparison Registers that have been loaded by the CPU since the last reset or since the activation of the Comparison Register clear bit are compared to the received data stream.

Flow control of the transmitted data stream can be controlled by the UART directly. This is done by programming Comparison Register 0 and 1 with flow start and stop characters, respectively. When either of these programmed start or stop flow control characters are matched in Rx FIFO 12, the UART automatically enables or disables the transmitter. The transmitter will complete the sending of any byte in its Tx shift register 20 as the flow control stops characters from being transferred from Tx FIFO 14 to the shift register 20. These Flow Control Comparison Registers enable and disable the transmitter by changing the state of the transmitter enable bit. The flow control characters are received on the SIN line to Rx shift register 26 and can be 8 byte characters. The automatic flow control feature can be overridden at any time by the CPU via the transmitter enable bit. This feature can be disabled via the automatic flow control bit to permit binary file transfer. After reset, Comparison Registers 0 and 1 are automatically loaded with the XON character (11 hex) and the XOFF character (13 hex), respectively. If the Comparison Flow Control bit is enabled, then the matched characters are not put into Rx FIFO 12 and the TFC status bit in the IIR is set immediately. If the Comparison Flow Control bit is not enabled, then the matched characters are put into Rx FIFO 12 and when they reach the top of FIFO 12, they set the TFC status bit in the IIR.

Automatic flow control is also available through the /CTS pin. When enabled, this feature starts and stops transfers to the Tx shift register 20 when /CTS is active or inactive, respectively. Transmitter flow control via /CTS is accomplished by setting or clearing the transmitter enable bit. Transmitter flow control via both the Comparison Registers and /CTS is allowed. If this is the chosen mode of operation, then the most recent input to the transmitter enable bit from the Comparison Registers, the /CTS pin or the CPU prevails.

In 16-bit mode, the Comparison Registers are accessed two at a time. In 8-bit mode, the Comparison Registers are accessed one at a time.

Each of the four serial channels of the UART can control both internal and external FIFOs for the UART transmitter. The internal Tx FIFO 14 for each channel is 16 bytes deep. Based on 24-bit wide registers, the external Tx FIFOs can be up to 16.777216 Mbytes deep.

In an internal Tx FIFO transfer, the CPU writes data to Tx FIFO 14 in bus wide groups. As stated above, the data is sent out serially by the transmitter with the least significant byte sent first. The transmitter sends all data in Tx FIFO 14 as long as Tx FIFO 14 is enabled. If Tx FIFO 14 is disabled while a byte is being shifted out, that particular byte is finished, but no more bytes are transferred to the Tx shift register 20.

If the number of data bytes to be transferred to Tx FIFO 14 is less than one bus width, the CPU will send advanced notice to the UART. As stated above, this is done by activating the /HBE and A0 input signals. Data in the Tx FIFO 14 is always stored in consecutive byte locations regardless of the number of bytes in each CPU transfer.

The CPU must program bits 2 and 1 of the Channel Operation Register (COR2, 1) for DMA mode and Tx DMA enable, respectively. Transfers to Tx FIFO 14 executed by DMA are started when Tx FIFO 14 is empty. In DMA mode 0, the transfer request pin deactivates after the first transfer of data into Tx FIFO 14. In DMA mode 1, the transfer request pin deactivates when Tx FIFO 14 is full. All transmitter DMA data transfers must be the full width of the bus or the /HBE and A0 bus signals must indicate a byte-wide transfer.

The UART also provides for maintaining an external Tx FIFO in conjunction with a system DMA unit. This is done to allow increased transmitter FIFO length without significantly increasing UART die size.

Figure 7:
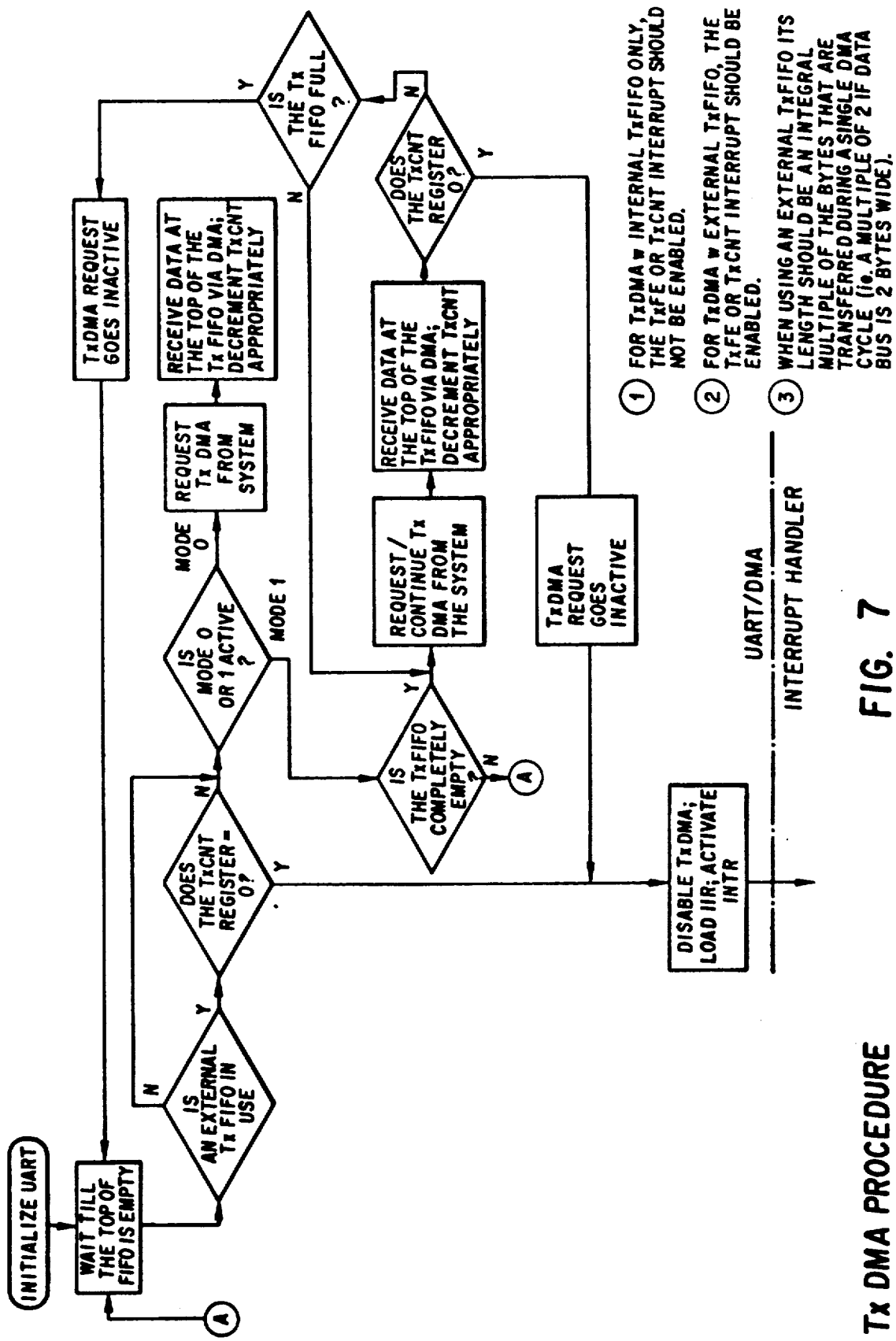
FIG. 7 is a flow sheet illustrating the procedure for maintaining an internal and/or external transmitter FIFO in conjunction with a system DMA unit.

Referring to FIG. 7, to maintain an external Tx FIFO, DMA control circuitry requests DMA transfers and notifies the CPU when a preselected number of bytes are to be transferred from the system memory via DMA. One additional register is provided for external FIFO control. This is the Tx DMA counter register. It keeps track of the number of bytes transferred from the memory via DMA. The CPU programs this counter with the number of bytes to be transferred. The counter decrements for each byte transferred during Tx DMA. When the counter reaches 0, the Tx counter bit in the IIR field is set and further Tx DMA requests are automatically disabled by clearing the Tx DMA enable bit (COR1). If enabled, i.e., bit IER2 set, an interrupt will be sent to the CPU. The CPU responds to this interrupt by:

1. Checking the CSR to determine the interrupt;
2. Checking the Tx DMA counter to disable the interrupt;
3. Restarting the system DMA for another Tx transfer; and
4. Setting the Tx DMA enable bit (COR1) to continue further Tx DMA requests by the UART.

The TX DMA counter 24 will be automatically reloaded after the Tx DMA enable bit is set. The CPU may reprogram the DMA counter 24 at anytime. If the DMA counter 24 is reprogrammed to 0, or if it is not programmed after a reset, then the external FIFO control is not active.

If the number of bytes to be transferred via Tx DMA is less than an integral number of bus widths, one of two options is available.

1. If the system DMA is sophisticated enough to recognize and signal the less-than-bus-wide transfer of data to the UART, then it can execute the transfer itself through /HBE and A0 inputs;
2. If the DMA can't execute this transfer, then the CPU must do the last transfer.

Each serial channel of the UART can also control internal and external FIFOs for the receiver. The internal Rx FIFO 12 for each channel is 16 bytes deep. External Rx FIFOs can be up to 16.777216 Mbytes deep.

In an Rx FIFO transfer without DMA, bits 2 and 1 in the ROR field are set to determine the number of bits in the Rx FIFO 12 before an interrupt is triggered (00=1 char., 01=¼ full, 10=½ full, 11=¾ full). Setting bit 7 in the IER field allows an interrupt to be issued when Rx FIFO 12 fills to the predetermined trigger level. Bits 4 and 3 of the ROR field determine the duration, expressed in character times, that a data byte must wait in Rx FIFO 12 until a timeout interrupt is issued to the CPU. This interrupt, if enabled, is issued if at least one data byte has been in Rx FIFO 12 for the number of character times specified and there has been no CPU access or serial data entering Rx FIFO 12 during that time. Setting bit IER1 enables timeout interrupts.

The CPU, upon receiving an interrupt will read the IIR field and check each bit for a pending interrupt. Finding bit 7 set indicates that Rx FIFO 12 is at its trigger level or a timeout interrupt is pending. The CPU reads the Bytes Till Exception Register (BTE) 18 to get the count of the number of valid bytes it can remove from Rx FIFO 12. Then it reads these bytes from the DATA Register until that count is reached.

Since the CPU data bus can be wider than one byte and the serial data is always received in one byte increments, it is possible to have fewer bytes in Rx FIFO 12 than the bus is wide. This possibility will only occur during the last access by the CPU before the count of BTE 18 reaches zero. For example, if the data bus is 2 bytes wide and there are 15 bytes to be removed from Rx FIFO 12, as indicated by BTE 18, the CPU can do seven consecutive 2 byte wide reads without any further need to check the data status. Before the last read of the DATA Register, the CPU reads the FSR field to obtain the valid byte positions. It then reads the DATA Register for the last time to extract the remaining data bytes.

If another byte enters Rx FIFO 12 after the CPU has read the FSR field, but before it has read the DATA Register, the new byte will not be placed at the top of Rx FIFO 12. It is not added to the data that the CPU could read from Rx FIFO 12 until after the read of the DATA Register is finished.

DMA transfers using only Rx FIFO 12 are prepared for by executing the following initialization steps. The Rx FIFO trigger level bits in the ROR field (ROR3, 2) and the timeout delay bits ROR5, 4 are set to the required level. The Rx DMA mode select bit (COR2) is programmed for either single or multiple DMA transfers (0 and 1, respectively). Assuming DMA mode 1 is selected and Rx DMA enabled (COR 2,0 set), the following occurs.

Automatic DMA requests to transfer data from the UART will begin whenever the data reaches the trigger level. All consecutive valid data will be transferred until either an exception is encountered or until the number of valid data bytes left is less than one bus width. If the first exception encountered is an empty Rx FIFO 12, DMA requests will stop until the trigger level is reached.

If the first exception is a line status error, DMA transfers will stop when this byte is among those to be transferred next. The appropriate line status error bit(s) will be set in the IIR field and in BSR 16. If enabled, an interrupt will be issued to the CPU. At this point, the CPU responds as follows:

1. Read the CSR field to determine the type of interrupt(s);
2. Read the FSR field to determine the position of valid data;
3. Read BSR 16 to pinpoint the specific nature of the exception and clear the interrupt(s);
4. Execute the service routine for the specific LSI; and
5. Clear Rx FIFO 12 and execute the purge routine to eliminate the remaining incoming data associated with that block, then request retransmission of the data.

Automatic Rx DMA transfers will again start after the trigger level is reached or a timeout occurs.

If the first exception is a Comparison Register Match, the appropriate bits in the IIR field and BSR 16 will be set. If enabled, an interrupt will be issued to the CPU. At this point, the CPU responds as follows:
1. Read the CSR field to determine the type of interrupt(s);
2. Read the FSR field to determine the valid data byte locations;
3. Read BSR 16 to identify the matched bytes;
4. Read the Data Register, discarding the matched bytes and keeping the data bytes; and
5. Execute the appropriate control character service routine.

If the number of consecutive valid data bytes at the top of Rx FIFO 12 is less than one data bus width wide (e.g., 3, 2, or 1 byte in 32-bit access mode; 1 in 16-bit access mode), then DMA requests will stop and the UART will wait for enough bytes to arrive to reach the trigger level or until a timeout occurs. If a timeout occurs, the CPU will be required to remove the remaining valid data bytes and set the Rx DMA enable bit to restart the Rx DMA requests. Procedures for handling less than a data bus width of data are as follows:
1. Check the CSR field to determine the interrupt and consecutive valid data;
2. Read Rx FIFO 12 to extract all remaining bytes (check the FSR field when appropriate);
3. Prepare system DMA for next transfer; and
4. Set the Rx DMA enable bit to allow DMA transfers to continue.

DMA mode O operation is handled in the same way as mode 1, except that DMA requests are started as soon as one data bus width of valid data (4 bytes in 32 bit mode, 2 in 16 bit mode) has been accumulated. Automatic DMA requests stops for any exceptions mentioned for DMA mode 1. DMA transfers will restart (according to mode 0 criterion) after any exceptions, timeouts or insufficient valid data width conditions have been cleared and the Rx DMA enable bit is set.

Figure 8A:
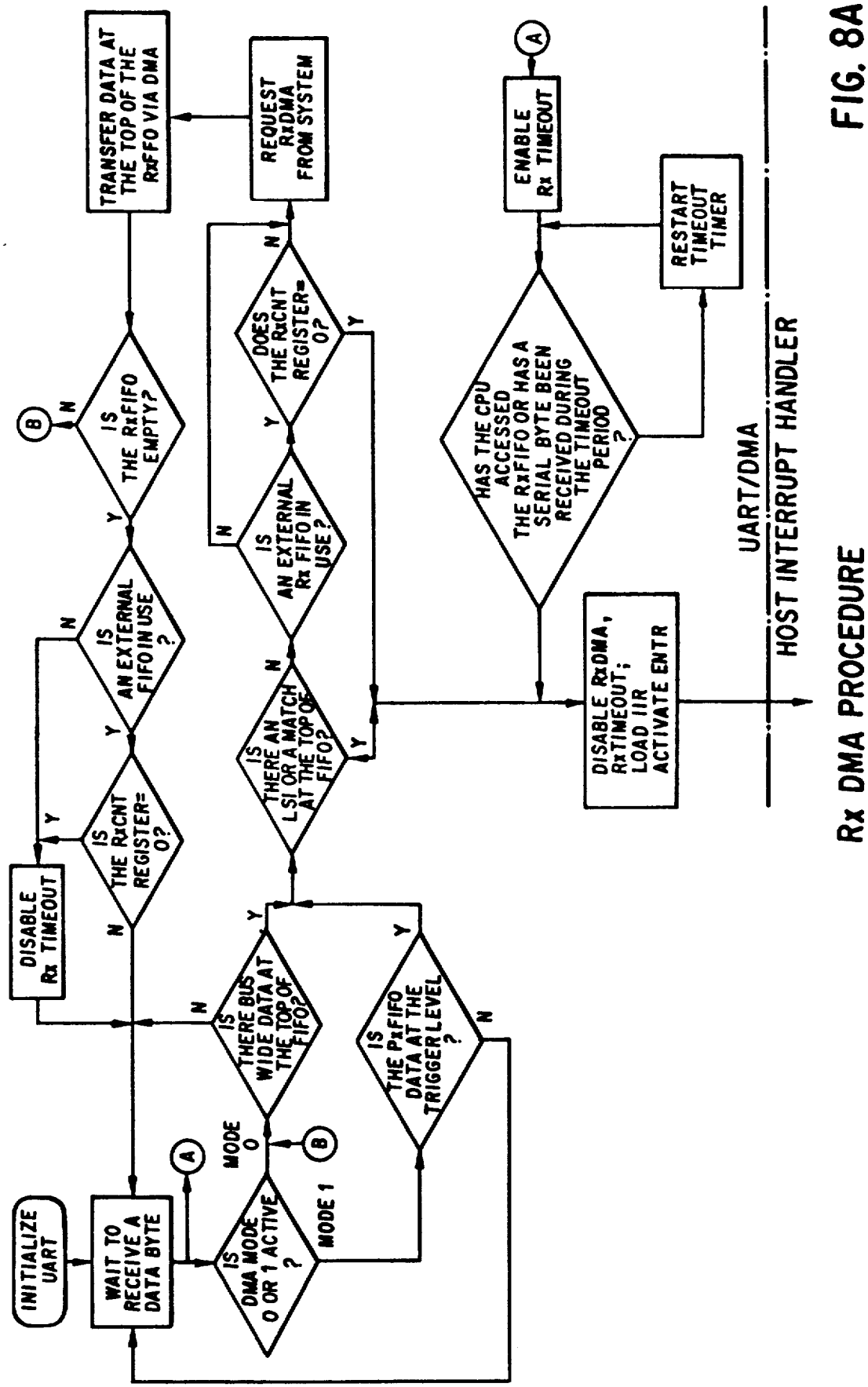
FIGS. 8A-8C are a flow sheet illustrating the procedure for maintaining an internal and/or external receiver FIFO in conjunction with a system DMA unit.
Figure 8B:
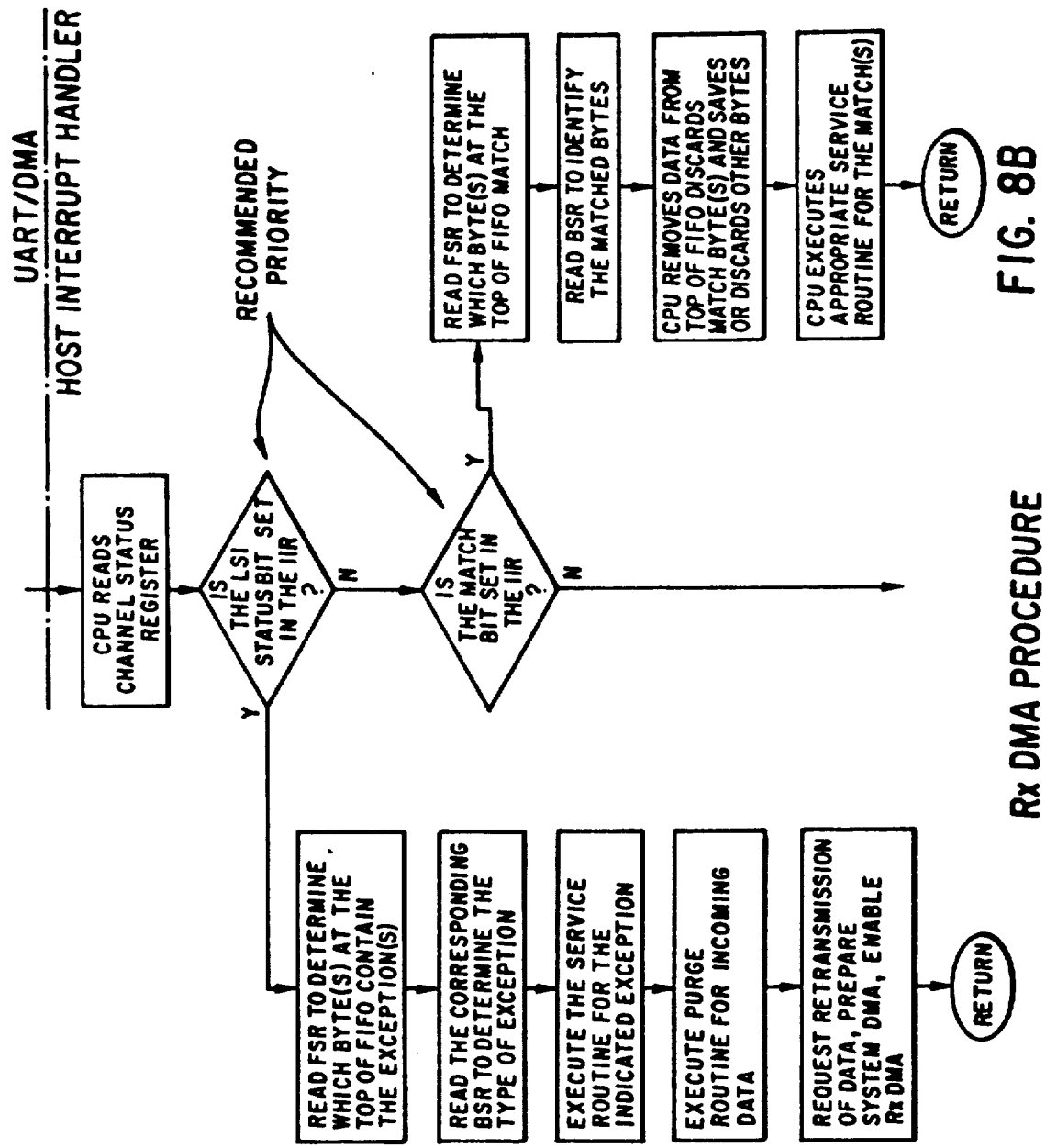
Figure 8C:
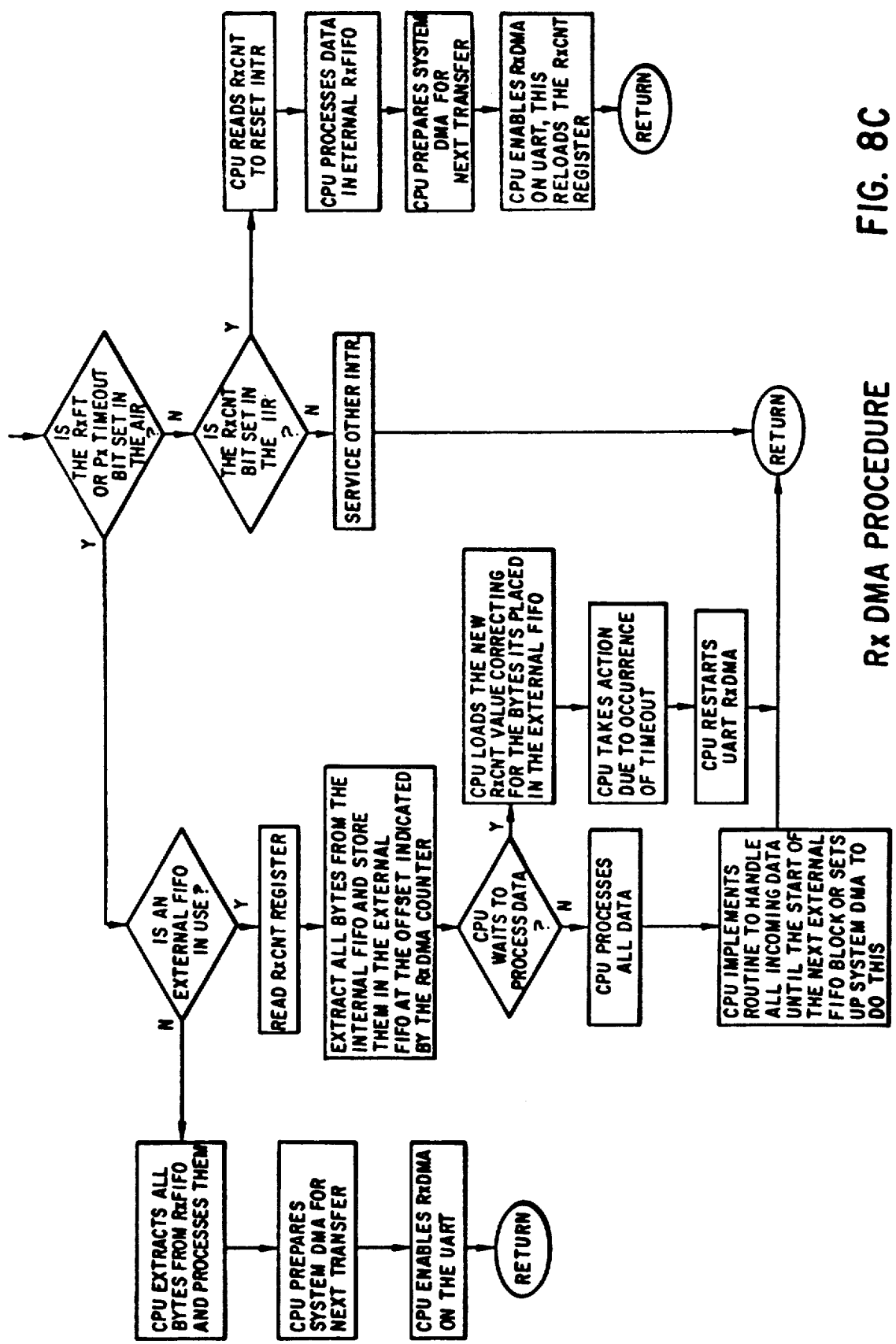

The UART also provides for maintaining an external Rx FIFO in conjunction with a system DMA unit. This is done to allow increased Rx FIFO length without significantly increasing the UART die size. Referring to FIGS. 8A-8C, to do this, control circuitry that requests DMA transfers and notifies the CPU when a preselected number of bytes has been transferred is provided. One additional register is provided for external Rx FIFO control. This is the Rx CNT count register 26. It keeps track of the number of bytes transferred from Rx FIFO 12 via DMA. The CPU pròrams this counter with the number of bytes to be transferred. The counter decrements with each valid byte transferred. When it reaches 0, the Rx CNT bit in the IIR field is set and if enabled (IER7 set) an interrupt is issued. The Rx DMA bit in the control register (COR0) is cleared at this time, disabling further Rx DMA. UART operation reverts to the non-DMA transfer mode until the CPU sets the Rx DMA enable bit, again. The CPU responds to the Rx CNT interrupt by:
1. Reading the CSR field to determine the interrupt;
2. Reading the Rx CNT register the clear the interrupt;
3. Processing the bytes stored in the external Rx FIFO;
4. Preparing the system DMA for subsequent transfers; and
5. Setting the Rx DMA enable bit in the Channel Operation register to allow subsequent DMA transfers.

In mode 1, DMA reaching trigger level of Rx FIFO 12 starts the transfer to the external Rx FIFO. The transfer continues until all consecutive valid data bytes in Rx FIFO 12 have been transferred, there is a line status condition or until a byte match condition occurs at the top of Rx FIFO 12. If the counter is not zero and there is less than one bus width of consecutive valid data at the top of Rx FIFO 12, then the UART will wait for enough bytes to arrive to reach the trigger level and continue a full bus width DMA transfer. If enough bytes don't, arrive a timeout interrupt will be issued to the CPU. The CPU response to a timeout interrupt is:
1. Check the CSR field, to determine the interrupt and consecutive valid data;
2. Check the RCR to clear the interrupt and determine the number of bytes in the external Rx FIFO that need to be processed;
3. Read Rx FIFO 12 to extract all remaining bytes (check the FSR field when appropriate);
4. Process the bytes stored in the external Rx FIFO; and
5. Start a routine to handle the remaining incoming bytes in this block.

The Rx DMA counter 26 is reloaded to the preprogrammed value after the Rx DMA enable bit is set. The enabled Rx DMA transfer will start again, as soon as, the trigger level is reached. In DMA mode O, transfer will start, as soon as enough data is assembled to make one complete bus width transfer.

The CPU may reprogram the DMA counter at anytime. If the DMA counter is reprogrammed to 0 or it is not programmed after a chip reset, then external Rx FIFO control is not active. Line status or byte match conditions are handled the same way as in the internal Rx FIFO mode.

There are eight types of interrupts the CPU can enable via the IER field. Two report receiver status, three report transmitter status and the other three report input status, line status and comparison register matches.

Setting bit IER7 allows an Rx FIFO 12 at trigger level indication (IIR7) to activate the interrupt. If this interrupt is pending, the CPU response is:
1. Check the IIR field to determine the interrupt;
2. Check the Bytes Till Exception Register 4 to determine the number of bytes till an exception;
3. Extract all of the consecutive valid data bytes till an exception (bit IIR7 is cleared when the data falls below the trigger levels); and
4. Read the FSR and BSR fields and extract any remaining valid data bytes along with any pertinent line status or match information about the invalid data bytes.

Setting bit IER7 when the external Rx FIFOs are in use allows the RCR (IIR1) indication to activate the interrupt signal. The RCR indication IIR1 is set when the RCR reaches 0.

Another Rx interrupt enabled by setting bit IER1 is the timeout interrupt. This indication goes active when an internal timer reaches zero. The indication means that data has been sitting in Rx FIFO 12 longer than a preprogrammed limit without the CPU taking action or additional data arriving. This timeout interrupt prevents data that can't reach the trigger level from being stuck in the FIFO indefinitely. It triggers the same indication (IIR7) as RFT, because the CPU response is the same for timeout, as for the RFT indication.

The internal timer for timeout indication is started when the first byte enters Rx FIFO 12 and is stopped when the last byte is removed from Rx FIFO 12. The timer is automatically restarted each time the CPU removes a byte from Rx FIFO 12 or each time the Rx shift register 27 loads a byte 27 from Rx FIFO 12 or each time Rx shift register loads a byte into it. The duration of the timer is programmed by setting bits 4 and 3 in the ROR. All timer durations are increments of 1 character time (00 = 1 char., 01 = 2 chars., 1 = 3 chars., 11 = 4 chars.). If the programmed duration of the timer expires before the CPU accesses Rx FIFO 12 or another retrieved byte is loaded into Rx FIFO 12, then the timeout indication (IIR7) is set.

An external Rx FIFO is considered to be in use when both the Rx DMA enable bit is set and the RCR 26 is loaded. The Rx timeout operation when using an external Rx FIFO is identical to that listed above for Rx FIFO 12, except in two respects.

1. The timeout duration is lengthened by 100×. This is done because it is assumed that the system will be receiving files instead of accepting input from a user terminal and, therefore, the timeout durations should be much longer. Specifically, if the file is being transferred at 9600 baud using 8 data, 1 stop and no parity, then the Rx timeout delays available to the user are approximately 100, 200 300, 400 ms.
2. Once started, the timeout timer is only disabled if both Rx FIFO 12 is empty and RCR 26 = 0. This allows the timer to monitor time delays for both the internal and external Rx FIFOs. This is useful because data could conceivably be stuck in either internal, external or both Rx FIFOs.

Setting bit IER6 allows the Comparison Register Match indication to issue an interrupt. The comparison match will occur when the Comparison Register enable bit TOR6 is set and a data byte at the top of Rx FIFO 12 matches a byte loaded into a Comparison Register. In response to the interrupt, the CPU will:
1. Read the IIR field to determine the interrupt;
2. Read the FSR field to determine if there is valid data at the top of Rx FIFO 12;
3. Read BSR 16 to determine the byte that matched and what it was (this clears the interrupt); and
4. Read the DATA Register.

Setting bit IER5 allows Line Status indications (LSI) to activate an interrupt when the bytes come to the top of Rx FIFO 12. These occur due to either an overrun error (OE), parity error (PE), framing error (FE) or a break indication (BI). The specific indication is associated with the byte that caused it in BSR 16. However, the OE will be indicated as soon as the UART recognizes this condition. In response to an LSI, the CPU will:
1. Check the IIR field to determine the interrupt;
2. Check the FSR field to determine if there is valid data at the top of Rx FIFO 12;
3. Check BSR 16 to determine the byte(s) that caused the LSI (this clears the interrupt); and
4. Read Data Register 10.

Setting bit IER4 allows the Input Status Indication (ISI) to activate an interrupt. An ISI occurs when any of the general-purpose input lines change. If bit IER4 is set then this indication will activate an interrupt. The CPU response to this interrupt is:
1. Read the IIR field to determine the interrupt; and
2. Read the DIR field (this clears the interrupt).

Setting bit IER3 allows the Tx flow control indication (TFC) to activate an interrupt. The TFC indication occurs when a change to the Tx enable bit has been made due to a match in Rx FIFO 12 with Comparison Register 0 or 1 or due to a change on the/CTS pin. This assumes that these flow control options are enabled. The Tx flow control consists of automatically starting or stopping the transmitter when user determined bytes such as XON or XOFF are detected in the data stream. Reading the TOR field to check the Tx enable state clears the interrupt. It's purpose is to inform the CPU that a change of state has occurred to the Tx enable bit. The CPU can override an automatic setting of the Tx enable bit at anytime by simply writing to it. This interrupt occurs immediately upon a match if TOR3 is set. If TOR3 is 0 and a match occurs, then the interrupt goes active when the flow control character reaches the top of the FIFO. If TOR3 is set, then the flow control characters are not put into the FIFO.

Setting bit IER2 allows the Tx FIFO empty indication or the Tx DMA count = 0 indication to activate an interrupt. When Tx FIFO 14 is empty, an indication is given through bit IIR2. The CPU responds to this interrupt by:
1. Reading the IIR field to determine the interrupt; and
2. Either loading data into Tx FIFO 14 or if its the start of Tx DMA, enabling the Tx DMA bit (this clears the interrupt). If there is no data to transmit the CPU can clear the Tx enable bit to clear the interrupt.

If an external Tx FIFO is in use, then the IIR2 indication is activated when the Tx DMA counter reaches its 0 count.

Once the Comparison Registers have been programmed and enabled, each byte entering Rx FIFO 12 is checked for a match. The UART contains 8 Comparison Registers and only those that are explicitly loaded by the CPU are actively compared. Therefore, any number of "control" characters up to 8 can be in use. A match with any Comparison Register, except Comparison Registers 0 and 1, will be indicated by bit IIR6 and the appropriate BSR bits when it is among the next data to be taken from the top of Rx FIFO 12. Assuming an active interrupt was caused by a Comparison Register match, the CPU will:
1. Read the IIR field to determine the interrupt;
2. Read the FSR field to determine the valid data at the top of Rx FIFO 12;
3. Read BSR 16 to determine which byte matched and what it was; and
4. Read Data Register 10 to extract the bytes from the Rx FIFO 12.

The CPU retrieves the valid data sorting it from the control character(s). A match with the Comparison Registers handling flow control (0 and 1) is indicated by IIR3.

Transferring byte-wide serial data to a word-wide (I.E. 16-BIT) parallel data bus and vice versa requires an additional constraint that is not present memory/CPU exchanges. In theory, the CPU may access each serial channel any one of three ways: odd byte, even byte or word transfers. Because the data from each channel is always ordered byte-by-byte, it must be presented to the CPU with the original order preserved. Two signals issued by the CPU typically control the way in which the data will be transferred. The /HBE and A0 input signals to the UART, which are used to control byte transfers indicate the number of bytes and which part of the 16-bit CPU bus is used, not which bytes in the UART FIFOs will be accessed.

The following describes typical 16-bit bus transfers to a peripheral and then the 16-bit bus transfers to the UART.

As stated above, a 16-bit wide data bus allows the CPU to transfer data to or from a peripheral device in three different ways. Table 1 below sets forth the manner in which the UART will enable the data bus for the given states of /HBE and A0. During conventional transfers, the CPU establishes the control signals /HBE and A0 and transfers the data utilizing normal transfer procedures. The data, if it is being sent, has a predetermined location to go to based upon the address and the data position on the data bus. This is true for each of the three types of transfers. If the data is being received by the CPU, then it is also handled in the CPU based upon the address and the data's position on the data bus.

When simultaneously transferring from the CPU to the UART 16 bits of data that is to be transmitted serially, the data's predetermined position in the UART FIFO depends upon the address and the data bytes' position on the data bus. However if only 8 bits of data is being sent to the UART for serial transmission, then the predetermined position in the UART's FIFO depends upon the address and the number of bytes being sent, not by the byte's position on the data bus.

When the transferred data has been received serially by the UART and will be transferred across a 16-bit bus to the CPU, the data's "order of reception" must be preserved during the 16-bit data bus transfer. During a 16-bit wide data transfer, this order is preserved with conventional constraints of address and data bus position. However, during an 8-bit transfer the next byte available in the UART FIFO is transferred to the data bus regardless of the position on that bus that it will occupy, in other words, regardless of whether it will be in the high byte or low byte position.

TABLE 1

| TRANSFER TYPE | /HBE | A0 | BUS ACTIVITY |
| --- | --- | --- | --- |
| even word | 0 | 0 | D15-D0 |
| odd byte | 0 | 1 | D15-D8 |
| even byte | 1 | 0 | D7-D0 |

As stated above, the odd and even byte transfers determine on which part of the bus the next byte in the Rx FIFO 12 will be placed. The Data and Status Registers operate in the same manner. Status must be read before data in order to associate the status byte with the appropriate data byte.

Writing to the DATA Register loads data into Tx FIFO 14. Data can be written to the DATA Register using any /HBE and A0 combination. During single byte transfers, the data byte will be located in the next available space in Tx FIFO 14, regardless of its position on the CPU bus (D15-D8 or D7-D0). Word wide data is loaded into Tx FIFO 14 assuming that the data byte on D7-D0 should be transmitted immediately before the data on D15-D8.

All other registers besides Data and Status can be addressed on a byte-by-byte basis using /HBE and A0. For example, in the 16-bit access mode, if the register at address 5 is accessed with /HBE=0 and A0=1, then the register contents will be placed on D15-D8. Writes to odd and even byte wide registers are accomplished in a similar way using these strobes, as are word wide strobes.

It should be understood that various alternatives to the embodiment described herein may be employed in practicing the present invention. It is intended that the following claims define the invention and that methods and structures within the scope of these claims and their equivalents be covered thereby.

What is claimed is:

1. A data communications system comprising:

(a) a first station;
(b) a second station that includes means for issuing a read access request; and
(c) a data communications device connected between the first station and the second station for transferring data characters received by the data communications device from the first station to the second station in response to a read access request issued by the second station, the data communications device comprising
 (i) receiver memory means connected to receive data characters from the first station and having storage capacity for a plurality of data characters received from the first station;
 (ii) exception means responsive to data characters received by the data communications device from the first station for identifying whether a data character received by the receiver memory means will trigger an exception if transferred to the second station or whether the received data character is a valid data character;
 (iii) counter means connected to the exception means and to the receiver memory means for indicating the number of consecutively received valid data characters remaining in the receiver memory means for transfer to the second station upon receipt by the data communications device of a read access request from the second station; and
 (iv) transfer means connected to the receiver memory means and responsive to the read access request from the second station for transferring the number of consecutively received valid data characters to the second station.

2. A data communications device that performs serial-to-parallel conversion on digital data characters received by the data communications device from a first station for transfer to a second station connected to the data communications device in response to a read access request issued by the second station, the data communications device comprising;

(a) a receiver shift register connected to receive data characters serially transferred from the first station;
(b) receiver memory means connected to the receiver shift register for storing a plurality of data characters received from the receiver shift register for transfer to the second station;
(c) exception means responsive to data characters received by the data communications device from the first station for identifying whether a data character received by the data communications device will trigger an exception if transferred to the second station or whether the received data character is a valid data character;
(d) counter means connected to the exception means and to the receiver memory means for indicating a number of consecutive valid data characters stored in the receiver memory means that are available for transfer to the second station; and
(e) transfer means connected to the receiver memory means and responsive to a read access request from the second station for transferring the number of consecutive valid data characters from the receiver memory means to the second station.

3. A data communications device as in claim 2 wherein the exception means includes comparison means for comparing data characters received by the data communications device from the first station with preselected comparison information.

4. A data communications device as in claim 3 and further including means connected to the exception means for changing the preselected comparison information.

5. A data communications device as in claim 2 wherein the second station comprises a central processing unit, data storage means associated with the central processing unit, and means for transferring the consecutive valid data characters directly from the data communications device to the data storage means.

6. A data communications device as in claim 2 wherein the exception means includes means for identifying line status errors in data characters received from the first station.

7. A data communications device as in claim 2 wherein the exception means includes means for identifying that a data character received by the data communications device is the most recent data character received by the data communications device.

8. A data communications system that includes a data communications device connected between a first station and a second station for transferring data characters therebetween, the data communications system comprising:
  (a) storage means within the data communications device for storing a plurality of data characters received by the data communications device from the first station;
  (b) exception means responsive to data characters received by the storage means for determining whether each received data character will trigger an exception if transferred to the second station or whether the received data character is a valid data character;
  (c) counter means connected to the exception means and to the storage means for maintaining a count of the number of consecutive valid data characters stored in the storage means that can be transferred to the second station before an exception occurs; and
  (d) transfer means connected to the storage means and responsive to a read request from the second station for transferring the number of consecutive valid data characters from the storage means to the second station.

9. A data communications device that transfers digital data characters received from a first station to a second station, the data communications device comprising:
  (a) receiver memory means having storage capacity for a plurality of received data characters;
  (b) counter means connected to the receiver memory means for indicating a number of consecutive valid data characters that have been received by the receiver memory means for transfer to the second station before an exception is encountered; and
  (c) transfer means responsive to read access request issued by the second station for transferring the number of consecutively received valid data characters to the second station.

10. A method of reading a plurality of data characters from a data communications device that is connected to receive data characters from a first station and to transfer the received data characters to a second station in response to a read access request issued by the second station, the method comprising:
  (a) storing a plurality of data characters received by the data communications device from the first station in the data communications device;
  (b) determining whether each data character received by the data communications device is a valid data character;
  (c) maintaining a count of the number of consecutive valid data characters received by the data communications device; and
  (d) transferring the number of consecutive valid data characters from the data communications device to the second station in response to the read access request.

11. A method as in claim 10 wherein the step of determining whether each received data character is a valid data character includes the step of comparing each data character received by the data communications device with preselected comparison information such that a match between the received data character and the preselected comparison information results in that data character having been determined as not being a valid data character but rather a data character that will trigger an exception when transferred to the second station.

12. A method as in claim 11 and further including the step of changing the preselected comparison information.

13. A method as in claim 10 wherein the second station comprises a central processing unit and CPU storage means associated with the central processing unit, the method further including the step of transferring the consecutive valid data characters directly to the CPU storage means.

14. A method as in claim 10 wherein the step of determining whether each received data character is a valid data character includes the step of determining whether a data character received by the data communications device includes a line status error wherein transfer to the second station of a data character including a line status error will trigger an exception.

15. A method as in claim 10 wherein the step of determining whether a data character received by the data communications device will trigger an exception includes the step of determining whether a received data character is the most recently stored data character wherein transfer to the second station of the most recently stored data character will trigger an exception.

* * * * *